Figure 1:
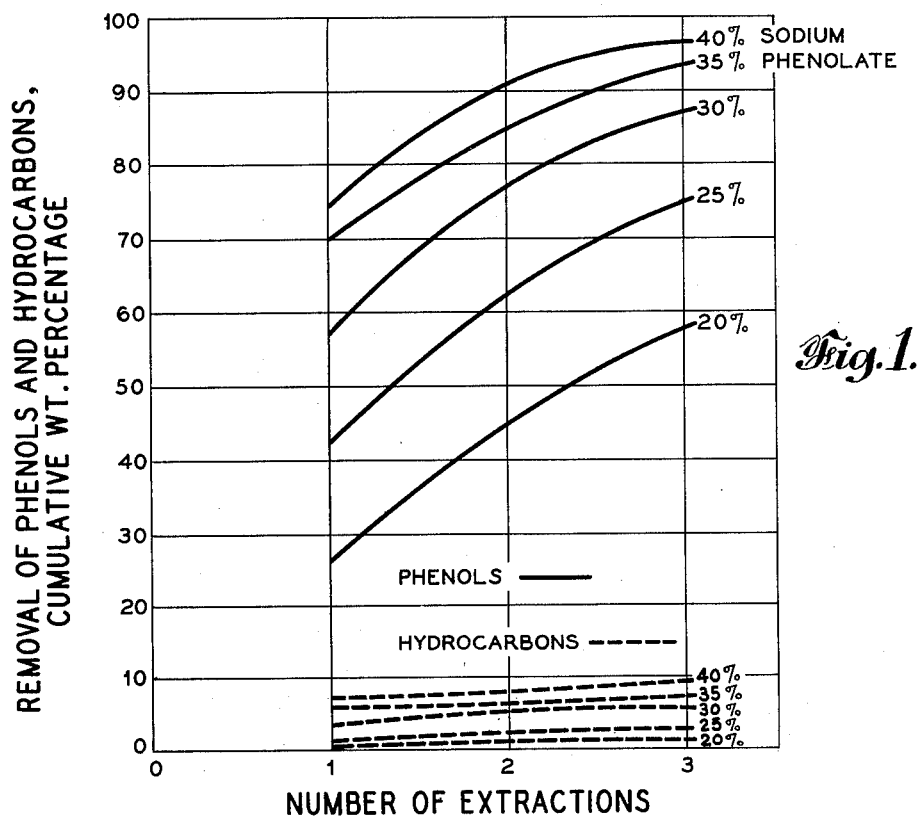

SOLUBILITY OF PHENOLS, HYDROCARBONS AND NITROGEN BASES IN SODIUM PHENOLATE SOLUTIONS OF DIFFERENT STRENGTHS.

INVENTORS
EDWARD W. DOUGHTY
JAMES V. MURRAY, JR.
JOHN D. FALES

BY
ATTORNEY

May 6, 1952  E. W. DOUGHTY ET AL  2,595,516

PROCESS FOR RECOVERY OF TAR ACIDS AND BASES FROM HYDROCARBON OILS

Filed Aug. 11, 1948  3 Sheets-Sheet 2

INVENTORS
EDWARD W. DOUGHTY
JAMES V. MURRAY, JR.
JOHN D. FALES
BY
D.C.Harrison
ATTORNEY

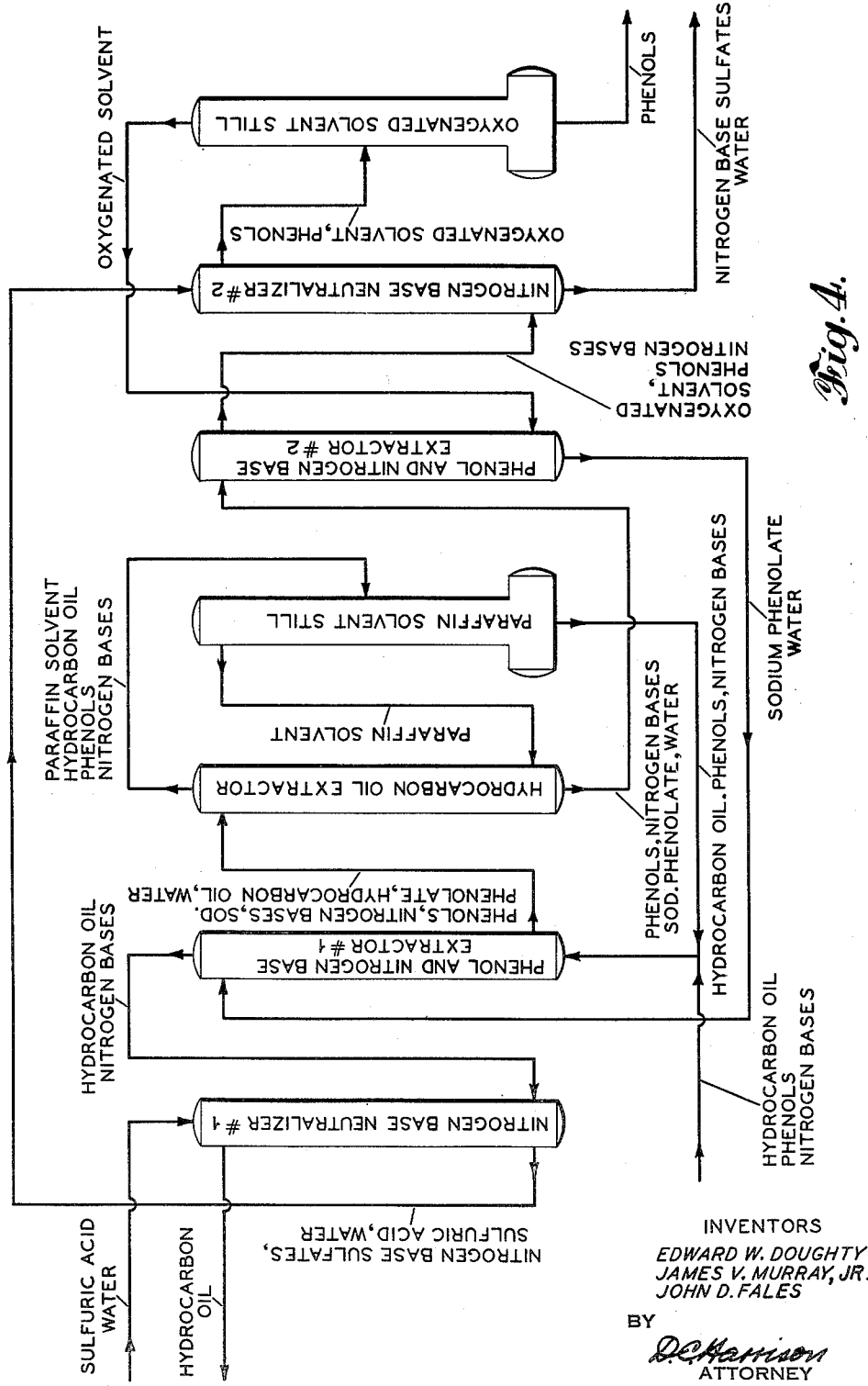

Patented May 6, 1952

2,595,516

UNITED STATES PATENT OFFICE 2,595,516

PROCESS FOR RECOVERY OF TAR ACIDS AND BASES FROM HYDROCARBON OILS

Edward W. Doughty and James V. Murray, Jr., South Charleston, and John D. Fales, St. Albans, W. Va., assignors, by mesne assignments, to Union Carbide and Carbon Corporation, a corporation of New York Application August 11, 1948, Serial No. 43,653

13 Claims. (Cl. 260—627)

This invention relates to the separation of phenols (tar acids) from mixtures containing such tar acids dissolved in hydrocarbons. Such mixtures are frequently encountered in industry, as in tar acid oils from coal tar, in hydrocarbon oils obtained by the hydrogenation of coal and in some of the petroleum oils. The recovery of the organic nitrogen compounds (tar bases), which are present in petroleum oils and in coal tar and coal hydrogenation oils, is also a part of the present invention.

At present, tar acids are recovered from coal tar oils by time-honored methods involving treatment of the oil with caustic soda solutions to form aqueous solutions of sodium phenolates, from which the phenols are "sprung" by treatment of the phenolate solutions with carbon dioxide. The caustic soda solution is regenerated by mixing the sodium carbonate solution thus formed with lime and the caustic soda solution is re-used after filtration of the precipitated calcium carbonate. The lime and carbon dioxide required are obtained by the calcination of limestone. The process is expensive to install and operate.

According to the present invention, phenols (tar acids) are separated from their mixtures with hydrocarbons by a process in which no appreciable amounts of raw materials are consumed. In brief, our process involves extracting mixtures of phenols and hydrocarbons with a strong aqueous solution of alkali metal phenolates to form a solution of the free phenols in the aqueous alkali metal phenolates, extracting said phenolate solution with a solvent for the phenols which is more volatile than said phenols and which is at least partially immiscible with said solution to form a solution of the phenols in the solvent and to separate the alkali-metal phenolate solution for re-use, and finally stripping the solvent from the phenol solution to recover the solvent and to isolate the phenols.

The effectiveness of the present process is greatly influenced by the strength of the alkali-metal phenolate solution used. We have found that a strong solution of the phenolates not only dissolves more of the phenols present in the hydrocarbon oils, but that, when a solution of the free phenols in strong alkali-metal phenolate solutions is extracted with a solvent for the phenols, it is not necessary to hydrolyze the alkali-metal phenolate in order to recover the free phenols. Thus the present process differs fundamentally from a previous proposal to treat tar oils with aqueous caustic soda to obtain an aqueous phenolate solution from which phenols are recovered by hydrolysis of the phenolate solution and extraction of the liberated phenols with a solvent. In the previous process, apparently it is necessary to dilute the phenolate solution to facilitate hydrolysis of the sodium phenolate to a phenol and sodium hydroxide. This necessitates the evaporation of the water added before the regenerated caustic soda can be re-used. In the present process, the strong phenolate solution need not be diluted to permit recovery of the dissolved phenols.

It is desirable that the alkali-metal phenolate solution contain at least 20% by weight of dissolved alkali-metal phenolate. The solvent power of the solution for phenols increases with the concentration of the alkali-metal phenolate, and the upper limit is fixed only by the concentration at which the alkali-metal phenolates begin to precipitate. There are indications that this may occur at concentrations of the phenolate above 50% by weight. The more concentrated solutions also tend to dissolve hydrocarbons, so that a concentration of about 35 to 45% alkali-metal phenolate by weight is preferred. The solubility of hydrocarbons and phenols in aqueous sodium phenolate solutions of different strengths is illustrated in the chart of Figure 1. The data were determined by shaking a light oil from a coal hydrogenation process with three successive portions of the sodium phenolate ($NaOC_6H_5$) solution, each portion being equal in volume to the light oil fraction being treated, the total percent of phenols and hydrocarbons removed in the three washings being plotted.

Figure 2:
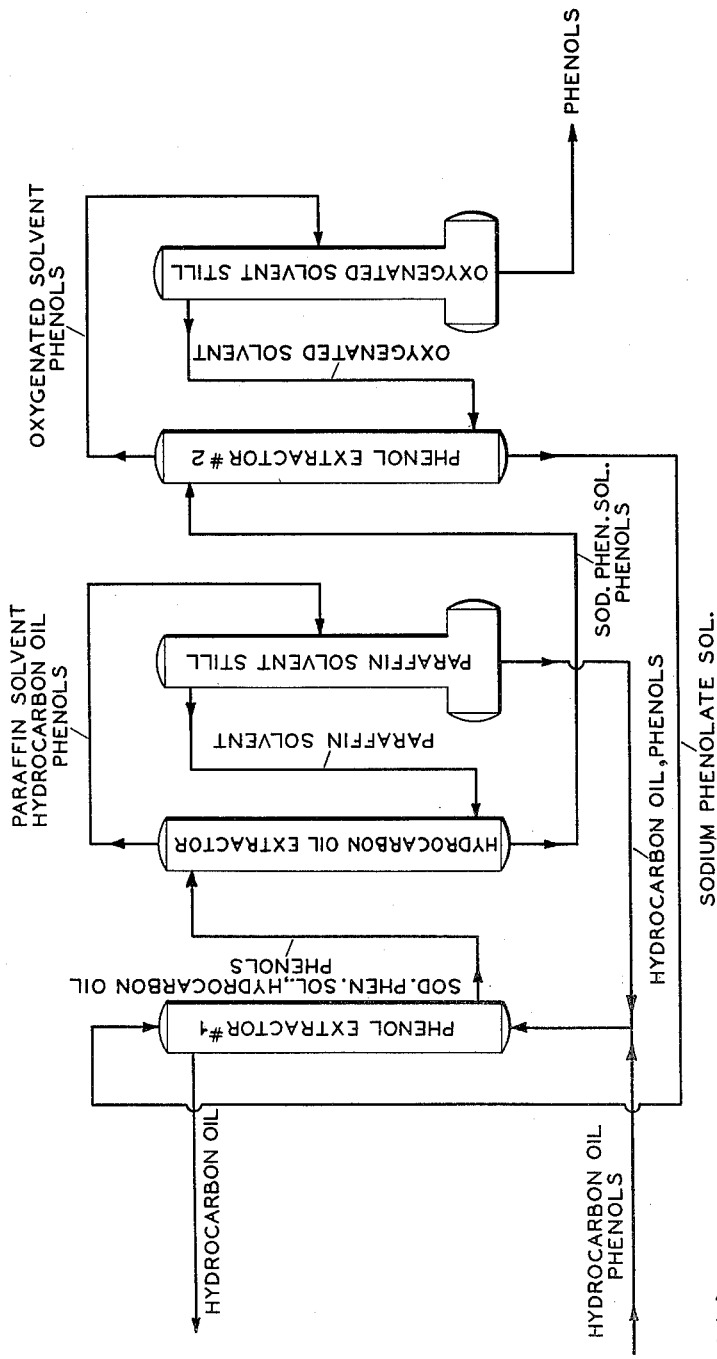

In Figure 2 of the drawings, a process is represented for recovering phenols from admixture with hydrocarbon oils which are reasonably free of nitrogen compounds (tar bases). According to the process, the mixture of hydrocarbon oils and phenols is introduced at the bottom of an extraction tower, (phenol extractor #1) down which is flowing a solution of the sodium salt of the phenols in water. The hydrocarbon oil, denuded of phenols, is removed at the top of the tower, and the heavier aqueous solution of the sodium phenolates containing the dissolved phenols and some of the hydrocarbon oils is withdrawn from the bottom of the tower.

The hydrocarbon oils are removed from this aqueous solution by extracting the solution in a tower (hydrocarbon oil extractor) with a solvent in which the hydrocarbon oils are preferentially dissolved. Examples of such solvents are the lighter paraffins, such as a commercial petroleum ether having a boiling point range of 30 to 60° C. When mixing equal volumes of this petroleum ether with the aqueous sodium phenolate solution, the following distribution coefficients were determined (concentration in petroleum ether-concentration in phenolate solution): phenols, 0.08; and hydrocarbon oils, 2.8. At a phenolate-to-petroleum ether ratio at which essentially complete removal of the hydrocarbon oils is obtained, some phenols also dissolve in the paraffin solvent and this mixture is distilled in the paraffin solvent still to recover the paraffin solvent for re-use in the hydrocarbon oil extractor. The residue from this distillation containing the hydrocarbon oils and a small amount of phenols is returned as part of the feed to the phenol extractor #1.

The purified solution of phenols in the aqueous sodium phenolate solution is pumped to the top of the phenol extractor #2 where the dissolved phenols are selectively extracted in a suitable solvent, preferably an oxygenated solvent, such as diisopropyl ether, such solvent being introduced at the bottom of the tower. The sodium phenolate solution, which is the raffinate from this extraction, is withdrawn from the bottom of the phenol extractor #2, and is recycled to the phenol extractor #1. The solution of phenols in the oxygenated solvent is passed to the oxygenated solvent still where the solvent is stripped off and recycled to the phenol extractor #2. The phenols, substantially free of hydrocarbons, are withdrawn as a residue from the bottom of the still.

Figure 3:
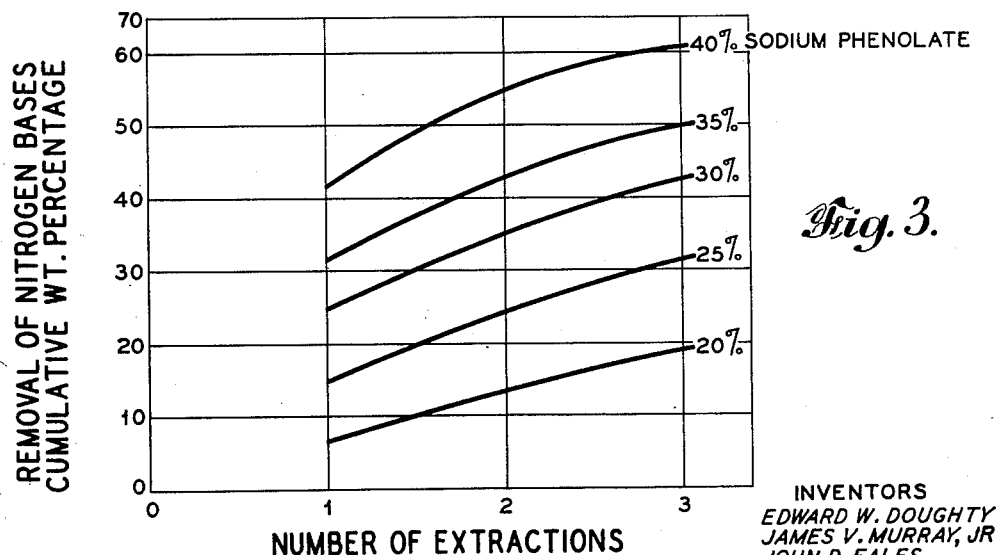

In the light oil from coal hydrogenation plants, and in coal tar light oil, both phenols and nitrogen bases are present, and the separation of such mixtures is an important aspect of the invention. As indicated on Figure 3 of the drawings, the nitrogen bases are also soluble in the aqueous sodium phenolate solutions, but to a lesser degree than the phenols. (The data plotted in Figure 3 were determined in the manner previously described in connection with Figure 1.) The ratio of dissolved nitrogen bases to dissolved phenols decreases with decreasing concentration of the sodium phenolate solution. This relationship may be utilized by extracting the light oil with less concentrated solutions of the phenolates in order to leave as much of the nitrogen bases in the hydrocarbon phase as possible. The bases and hydrocarbons which do dissolve in the aqueous sodium phenolate solution may be removed by extracting the solution with a cycloparaffin solvent, preferably one boiling between 49° C. and 81° C., such as cyclopentane or cyclohexane, distilling the extract to recover the solvent, and returning the still residue to be extracted with the sodium phenolate solution. The nitrogen bases are then removed as part of the phenol-free light oil, from which they may be recovered in the form of their salts by washing the oil with aqueous mineral acids, such as sulfuric, hydrochloric and phosphoric acids.

While the above process is feasible, it is difficult to make a sharp separation of the phenols and the nitrogen bases by extraction. Moreover, the nitrogen bases cannot be separated effectively by acidulation with aqueous acids in the presence of both hydrocarbons and phenols, because the base salts, instead of separating sharply in the aqueous phase, tend to dissolve in the oil phase. This solubility of the base salts in the oil phase is apparently caused by the formation of complex compounds between the nitrogen base salts and the phenols. We have found that the nitrogen bases may be separated from the phenols by carrying out the extraction processes so that ultimately both phenols and bases are transferred from solution in the hydrocarbon oils to solution in a water-immiscible oxygenated solvent. From such a solution, the nitrogen bases are readily recovered as their salts by acidulation with aqueous mineral acids, the nitrogen base salts being present in the aqueous phase which separates. Such a process is illustrated in Figure 4.

A light oil which may contain about 20 to 30% phenols, about 5 to 10% nitrogen bases and about 60 to 75% hydrocarbons, is introduced as part of the feed to the base of phenol and nitrogen base extractor #1. An aqueous sodium phenolate solution, containing, for example, 40% by weight of the phenolate, is introduced at the top of the tower. The ratio of phenolate solution to hydrocarbon oil may be varied considerably, for instance, experimental counter-current extractions have been made under equilibrium conditions using one volume of phenolate solution (40% by weight of phenolate) with two, one, and one-half volumes, respectively, of oil. At all ratios, essentially complete extraction of the phenols was obtained and the percentages of the nitrogen bases removed were 55, 64 and 77 respectively. Extrapolation of these results indicates that at phenolate-to-oil ratios above 3.0, only a small fraction of the nitrogen bases would remain in the oil phase. However, to reduce the size of the equipment needed, it is preferred to carry out the extraction using equal volumes of the phenolate solution to the hydrocarbon oil. Under these conditions, about one-third of the nitrogen bases remain in the lighter oil phase which is removed from the top of the phenol and nitrogen base extractor #1.

The lighter oil phase containing the nitrogen bases passes from the top of the phenol and nitrogen base extractor #1 to the bottom of the nitrogen base neutralizer #1 where it is contacted with aqueous sulfuric acid. Although not essential, it has been found desirable to use a stoichiometric excess of sulfuric acid at this point so that the resulting mixture of nitrogen base sulfates and sulfuric acid may be used for neutralizing additional quantities of nitrogen bases in a subsequent step. Sulfuric acid of 1.0 normality or stronger is preferred because weaker solutions are less effective in recovering all the bases. Because the hydrocarbon light oil extracted is substantially free of phenols, the light oil, which leaves the top of the neutralizer, is essentially free of basic nitrogen compounds. The mixture of sulfuric acid, nitrogen base sulfates and water separates from the light oil and leaves at the bottom of the nitrogen base neutralizer #1.

From the bottom of the phenol and nitrogen base extractor #1, there is removed the aqueous sodium phenolate solution containing the dissolved phenols, a major part of the bases and a small amount of the hydrocarbon oil, the exact amount of the bases and hydrocarbons being present being dependent on the concentration and relative amount of the sodium phenolate solution used. It is desirable to remove the residual hydrocarbon oil in order that pure phenols may be isolated in the final step of the process.

It has been found that hydrocarbons of the aliphatic or cycloaliphatic series which are more volatile than the hydrocarbon oils are selective solvents for these oils in preference to the nitrogen bases and phenols. Furthermore, the alkanes, such as the pentanes and the hexanes and mixtures thereof, are more selective than the cycloalkanes, such as cyclohexane. By treating the phenolate extract with petroleum ether having a boiling range of 30 to 60° C., the following distribution coefficients were obtained (concentration in petroleum ether/concentration in phenolate solution):

Phenols _____ 0.08
Nitrogen bases _____ 0.5
Hydrocarbon oils _____ 2.8

With reference to Figure 4 of the drawings, the aqueous sodium phenolate solution is introduced to the top of the hydrocarbon oil extractor where it meets an ascending current of a paraffin solvent, preferably introduced at a rate equal in volume to the feed rate of the phenolate solution. The paraffin solvent dissolves out substantially all the hydrocarbon oils from the phenolate solution and slight amounts of the nitrogen bases and phenols. The solution thus formed passes from the top of the hydrocarbon oil extractor to the paraffin solvent still where the paraffin solvent is distilled and returned to the hydrocarbon oil extractor for re-use. The still residue, containing the hydrocarbon oil, phenols and nitrogen bases is returned as part of the feed to the phenol and nitrogen base extractor #1.

The purified phenolate solution passes from the bottom of the hydrocarbon oil extractor to the top of the phenol and nitrogen base extractor #2. Here occurs a separation which is one of the fundamental steps of the present invention. The dissolved phenols and nitrogen bases are strongly held in the alkali-metal phenolate solution, possibly because of the formation of complex compounds. We have found that certain polar compounds will extract the phenols and bases from the aqueous sodium phenolate solution. These polar compounds are neutral, normally liquid organic solvents containing non-terminal oxygen attached only to carbon, which boil below 180° C. at atmospheric pressure and which are at least partially immiscible with the aqueous sodium phenolate solution. By the term "neutral" we exclude those organic compounds, such as the carboxylic acids, which titrate with caustic soda as acids, and those organic compounds, such as amines, which titrate with sulfuric acid as bases. By the term "containing non-terminal oxygen attached only to carbon" we exclude alcohols, which are inoperative because they form soluble complexes; carboxylic acids, which are disqualified because they form soluble sodium salts; and aldehydes, which are unsuitable because they condense readily in an alkaline medium. Stated positively we may use organic compounds taken from the class consisting of ethers, esters, and ketones which boil below 180° C. at atmospheric pressure and which are at least partially immiscible with 40% aqueous sodium phenolate ($NaOC_5H_6$) solution. By the term "non-terminal" oxygen, we mean that the oxygen atom or atoms occupy an internal position in the molecule, as is true of the oxygen atom or atoms of ethers, esters, and ketones, and as distinguished from the external or terminal position which the oxygen atom occupies in an aldehyde, for instance. By the term "at least partially immiscible" we means that two liquid layers separate on standing when equal volumes of the solvent and the sodium phenolate solution are mixed. Measured by this test, some of the lower alkyl ketones, such as acetone, and the lower alkyl acetates, such as ethyl and butyl acetates, are unsuitable, whereas the higher alkyl acetates containing at least five carbon atoms in the alkyl radical, and the alkyl ketones containing at least five carbon atoms in the molecule within the boiling range specified are satisfactory extractants. On the other hand, all the ethers, with the exception of dimethyl ether, which is a gas, are suitable and they are all immiscible with the sodium phenolate solution.

As an illustration of the suitability of various solvents for the extraction of free phenols from sodium phenolate, a solution of 40% aqueous sodium phenolate solution ($NaOC_5H_6$), free of dissolved phenols, was agitated with an equal quantity by weight of a hydrocarbon light oil having a distillation endpoint of 260° C. and containing about 29% phenols and 6% nitrogen bases. The aqueous phenolate extract was decanted and washed with three successive equal volumes of pentane to remove dissolved hydrocarbon oil, and the residual pentane was stripped off. A number of oxygenated solvents were evaluated for their effectiveness in removing phenols and bases from the purified sodium phenolate solution by determining the percentage of total solute (phenols and bases) removed by a single extraction with an equal volume of the solvent. The results follow:

| Solvent | Effectiveness— Weight Per Cent of Free Phenols and Bases Extracted from Sodium Phenolate Solution |
| --- | --- |
| Diethyl ether | 68 |
| Diisopropyl ether | 81 |
| Dibutyl ether | 58 |
| Phenyl methyl ether | 34 |
| Methyl isobutyl ketone | 53 |
| Methyl-amyl ketone | 42 |
| Diisobutyl ketone | 70 |
| Methyl isobutyl carbinol acetate | 72 |
| Amyl acetate | 52 |
| 2-Ethylbutyl acetate | 66 |

As shown in the above table, diisopropyl ether is a preferred solvent and the following distribution constants (ratio of concentration in ether to concentration in phenolate solution) were determined; for the phenols 2.9, and for the bases 3.5.

Returning to the phenol and nitrogen base extractor #2 of Figure 4, an oxygenated solvent of the type defined above, is introduced at the bottom of the tower, and in passing up the tower, it extracts the free phenols and bases from the descending phenolate solution. The regenerated phenolate solution is removed from the bottom of the tower, and returned to the phenol and nitrogen base extractor #1 to repeat the cycle. The phenolate used to start the process may be sodium phenolate ($NaOC_6H_5$) or a mixture of the sodium salts of phenol, the cresols or xylenols. As most coal tar light oils or coal hydrogenation light oils contain these phenols, as well as higher tar acids, an equilibrium in such cases will be reached whereby the distribution of the combined phenols in the recycled sodium phenolates will bear a more or less fixed relation to the distribution of the free phenols in the light oil being extracted. As is true of all cyclic processes, minor amounts of impurities may accumulate in the recycled sodium phenolate solution, which will require that a purge be taken to maintain the impurities at a fixed level. Alternatively, the phenolate solution may be removed for purification after it has been exhaustively re-used. Because very little alkali-metal hydroxide need be purchased, the use of the more expensive potassium or lithium phenolates is feasible, but sodium phenolate is preferred.

The solution of phenols and nitrogen bases in the oxygenated solvent passes from the phenol and nitrogen base extractor #2 to the nitrogen base neutralizer #2, where it meets the mixture of nitrogen base sulfates, sulfuric acid and water from the nitrogen base neutralizer #1. In the nitrogen base neutralizer #2, the remainder of the nitrogen bases are neutralized to form sulfate salts. In the presence of an oxygenated solvent, as contrasted with hydrocarbons, the aqueous nitrogen base sulfates separate sharply from the phenols and are removed from the bottom of the neutralizer. The free nitrogen bases may be recovered by known methods, such as by springing them with a stronger base, such as sodium or ammonium hydroxide. The nitrogen bases may contain aniline, toluidines, pyridine bases, and higher tar bases.

As an example of base neutralization, one liter of an isopropyl ether solution containing 50 grams of crude nitrogen bases and 200 grams of phenols (from coal hydrogenation light oil), was extracted with one liter of sulfuric acid (0.63 N). The aqueous extract was separated, made alkaline, and the free bases were isolated by extraction with isopropyl ether. Upon evaporation of the ether, 42.60 grams of nitrogen bases were recovered. By a second and third similar treatment of the original isopropyl ether solution, 1.70 grams and 1.23 grams respectively of the nitrogen bases were recovered for a total recovery of 45.53 grams or 91% of the bases originally present.

The solution of phenols in the oxygenated solvent passes from the top of the nitrogen base neutralizer #2 to the oxygenated solvent still, where the solvent is distilled over for re-use in the phenol and nitrogen base extractor #2, and the purified phenols are removed as a residue. These phenols are substantially free of hydrocarbons and nitrogen bases, and for this reason, they are suitable commercial products for making resins of the phenol-formaldehyde type. If desired, the mixed phenols may be fractionated to separate phenol, cresols, xylenols, and higher tar acids.

What is claimed is:

1. Process for recovering phenols from mixtures of hydrocarbons and phenols which comprises extracting such mixtures with an aqueous solution of alkali-metal phenolates containing at least 20% by weight of said phenolates to form a solution of free phenols in said aqueous solution, extracting said solution of free phenols with a neutral, normally liquid organic solvent, said solvent being immiscible with 40% aqueous sodium phenolate solution, containing non-terminal oxygen attached only to carbon and boiling below 180° C., to form a solution of the free phenols in said solvent and to separate a water solution of alkali-metal phenolates, and recycling said water solution of alkali-metal phenolates to the first extraction step.

2. Process as claimed in claim 1 in which the aqueous solutions of alkali-metal phenolates contain 35 to 45% by weight of said phenolates.

3. Process as claimed in claim 1 in which said organic solvent is a dialkyl ether.

4. Process as claimed in claim 1 in which said organic solvent is diisopropyl ether.

5. Process as claimed in claim 1 in which said organic solvent is an alkyl acetate containing at least five carbon atoms in the alkyl radical.

6. Process as claimed in claim 1 in which said organic solvent is an alkyl ketone containing at least five carbon atoms in the molecule.

7. Process as claimed in claim 1 in which the alkali-metal phenolates are sodium phenolates.

8. Process for recovering phenols from mixtures of hydrocarbons and phenols which comprises extracting such mixtures with an aqueous solution of alkali-metal phenolates containing at least 20% by weight of said phenolates to form a solution of free phenols in said aqueous solution, extracting said solution of free phenols with a neutral, normally liquid organic solvent, said solvent being immiscible with 40% aqueous sodium phenolate solution, containing non-terminal oxygen attached only to carbon and boiling below 180° C., to form a solution of the free phenols in said solvent and to separate a water solution of alkali-metal phenolates, distilling said solution of phenols in said organic solvent to recover said solvent and to isolate the phenols, and recycling said water solution of alkali-metal phenolates to the first extraction step.

9. Process for separating phenols from mixtures of phenols and hydrocarbons, which comprises extracting such mixtures with an aqueous solution of sodium phenolates containing from 29 to 45% by weight of said phenolates to form a solution of free phenols containing some of said hydrocarbons in said aqueous solution, extracting said solution of free phenols and said hydrocarbons with a liquid paraffin boiling below said extracted hydrocarbons to remove said hydrocarbons from said aqueous solution, and then extracting said aqueous solution with a liquid ether boiling below 180° C. to form a solution of the free phenols in said ether and to separate a water solution of sodium phenolates, recycling said water solution of sodium phenolates to the first extraction step, and distilling said ether solution to recover the ether and to isolate the phenols substantially free of said hydrocarbons.

10. Process for separating organic nitrogen bases from a homogeneous mixture of phenols, organic nitrogen bases and hydrocarbons, which comprises extracting said mixtures with an aqueous solution of alkali-metal phenolates containing at least 20% by weight of said phenolates to form a raffinate containing hydrocarbons and nitrogen bases substantially free of phenols, and treating said raffinate with an aqueous mineral acid to obtain two immiscible liquid phases, one of said phases being an aqueous solution of mineral acid salts of said nitrogen bases and the other phase being hydrocarbons substantially free of phenols and nitrogen bases.

11. Process for separating organic nitrogen bases from a homogeneous mixture of phenols, organic nitrogen bases and hydrocarbons, which comprises extracting said mixture with an aqueous solution of alkali-metal phenolates containing at least 20% by weight of said phenolates to form a raffinate containing hydrocarbons and nitrogen bases substantially free of phenols, and a phenolate extract containing the phenols and some of said hydrocarbons and nitrogen bases, treating said raffinate with an aqueous mineral acid to obtain two immiscible liquid phases, one of said phases being an aqueous solution of mineral acid salts of said nitrogen bases and the free of phenols and nitrogen bases, and extracting said phenolate extract with a cycloparaffin boiling between 49° C. and 81° C. to remove the dissolved nitrogen bases and hydrocarbons as a cycloparaffin extract, distilling this cycloparaffin extract to recover the cycloparaffin and to isolate a residue containing the nitrogen bases and hydrocarbons, and returning said residue for further extraction with said aqueous solution of alkali-metal phenolates.

12. Process for separating phenols and organic nitrogen bases from a homogeneous mixture of phenols, organic nitrogen bases and hydrocarbons which comprises extracting said mixture with an aqueous solution of alkali-metal phenolates containing at least 20% by weight of said phenolates to dissolve substantially all the phenols and a part of said nitrogen bases in said phenolate solution, extracting the phenolate solution containing the dissolved phenols and nitrogen bases with a neutral, normally liquid organic solvent, said solvent being immiscible with 40% aqueous sodium phenolate solution and containing nonterminal oxygen attached only to carbon and boiling below 180° C., to form a solution of free phenols and nitrogen bases in said solvent and to separate a water solution of alkali-metal phenolates, recycling said water solution of alkali-metal phenolates to the first extraction step, and mixing said organic solvent solution of free phenols and nitrogen bases with an aqueous mineral acid to form two immiscible liquid phases, one of said phases being an aqueous solution of nitrogen base mineral acid salts, and the other being a solution of phenols in said organic solvent.

13. Process as claimed in claim 12 in which said organic solvent is diisopropyl ether, and said mineral acid is sulfuric acid.

EDWARD W. DOUGHTY.
JAMES V. MURRAY, Jr.
JOHN D. FALES.

REFERENCES CITED

The following references are of record in the file of this patent:

UNITED STATES PATENTS

| Number | Name | Date |
|---|---|---|
| 1,506,385 | Rhodes | Aug. 16, 1924 |
| 2,082,626 | Hatman | June 1, 1937 |
| 2,200,370 | Koppers | May 14, 1940 |
| 2,247,523 | Schick et al. | July 1, 1941 |
| 2,378,232 | Luten et al. | June 12, 1945 |
| 2,417,291 | Cislak et al. | Mar. 11, 1947 |

FOREIGN PATENTS

| Number | Country | Date |
|---|---|---|
| 499,312 | Great Britain | Jan. 19, 1939 |
| 499,709 | Great Britain | Jan. 27, 1939 |
| 513,541 | Great Britain | Oct. 16, 1939 |